United States Patent
Jun

(10) Patent No.: US 8,045,817 B2
(45) Date of Patent: Oct. 25, 2011

(54) METHOD FOR IMPROVING IMAGE QUALITY, AND IMAGE SIGNAL PROCESSING APPARATUS AND AV DEVICE USING THE SAME

(75) Inventor: Byung-jo Jun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 944 days.

(21) Appl. No.: 12/019,700

(22) Filed: Jan. 25, 2008

(65) Prior Publication Data

US 2009/0028456 A1    Jan. 29, 2009

(30) Foreign Application Priority Data

Jul. 26, 2007  (KR) ......................... 10-2007-0075166

(51) Int. Cl.
*G06K 9/40* (2006.01)
(52) U.S. Cl. ....................... 382/254; 382/261
(58) Field of Classification Search ............... 348/402.1, 348/413.1, 416.1, 699, E7.007, E7.013; 375/240.16, 375/E7.104, E7.106, E7.123, E7.164, E7.256; 382/254, 261
See application file for complete search history.

(56) References Cited

U.S. PATENT DOCUMENTS

| | | | |
|---|---|---|---|
| 2002/0196362 A1 | 12/2002 | Yang et al. | |
| 2004/0151250 A1* | 8/2004 | Witterbrood et al. | .... 375/240.16 |
| 2005/0025243 A1 | 2/2005 | Sohn et al. | |
| 2005/0078212 A1* | 4/2005 | Ha | ............................. 348/441 |
| 2007/0014368 A1 | 1/2007 | MacInnis et al. | |
| 2007/0019114 A1* | 1/2007 | de Garrido et al. | ........... 348/701 |

OTHER PUBLICATIONS

Extended European search report dated May 20, 2010, issued in counterpart European Application No. 08158517.6-2218.

* cited by examiner

*Primary Examiner* — Gregory F Cunningham
(74) *Attorney, Agent, or Firm* — Sughrue Mion, PLLC

(57) ABSTRACT

A method for improving image quality, and an image signal processing apparatus and an AV device using the same are provided. In the method for improving image quality, processing image signals relating to improving the image quality can be adaptively performed based on the amount of movement of an input movie-image so that the image quality of the movie-image can be improved without breaking the image.

12 Claims, 6 Drawing Sheets

METHOD FOR IMPROVING IMAGE QUALITY, AND IMAGE SIGNAL PROCESSING APPARATUS AND AV DEVICE USING THE SAME

CROSS-REFERENCE TO RELATED APPLICATIONS

This application claims priority under 35 U.S.C. §119 from Korean Patent Application No. 10-2007-0075166, filed on Jul. 26, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to improving image quality.

2. Description of the Related Art

As technology for processing image signals has developed, the quality of images provided to users have improved. Movie judder cancellation (MJC) is one technique to improve the image quality of movie-image.

MJC can effectively reduce judder generated when a movie-image is reproduced. However, if MJC for the movie-image is performed, the movie-image appears broken, particularly when the movie-image has large amounts of movement.

Therefore, there is a need for methods to reduce judder in a movie-image by performing MJC on the movie-image without the image becoming broken.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a method for improving the image quality by adaptively processing image signals relating to improving the image quality based on the amount of movement of an input movie-image, so that MJC is performed on the movie-image without breaking the image, and an image signal processing apparatus and an AV device using the same.

According to an exemplary aspect of the present invention, there is provided a method for improving image quality, the method including detecting the amount of movement in an input movie-frame, and adaptively processing improvement of the image quality of the input movie-frame based on the detected amount of movement.

In processing improvement of the image quality, movie judder cancellation (MJC) of the input movie-frame is performed based on the detected amount of movement.

In processing improvement of the image quality, if the detected amount of movement is higher than a first threshold value and lower than a second threshold value, MJC performance level is changed according to the amount of movement.

In processing improvement of the image quality, if the detected amount of movement is higher than the first threshold value and lower than the second threshold value, the MJC performance level is inversely proportional to the amount of movement.

In processing improvement of the image quality, if the detected amount of movement is lower than the first threshold value, the MJC performance level is maximized, and if the detected amount of movement is higher than the second threshold value, the MJC performance level is minimized. The amount of movement includes at least one of the sum of absolute difference (SAD) of the input movie-frame, and the size of a motion vector of the input movie-frame.

According to an exemplary aspect of the present invention, there is provided an apparatus to improve image quality, including a detection unit which detects amount of movement of an input movie-frame, and an image quality improving unit which adaptively processes improvement of the image quality of the input movie-frame based on the amount of movement detected by the detection unit.

The image quality improving unit performs movie judder cancellation (MJC) of the input movie-frame based on the detected amount of movement.

If the detected amount of movement is higher than a first threshold value and lower than a second threshold value, the image quality improving unit changes the MJC performance level according to the amount of movement.

If the detected amount of movement is higher than the first threshold value and lower than the second threshold value, the image quality improving unit causes the MJC performance level to be inversely proportional to the amount of movement.

If the detected amount of movement is lower than the first threshold value, the image quality improving unit maximizes the MJC performance level, and if the detected amount of movement is higher than the second threshold value, the image quality improving unit minimizes the MJC performance level.

The amount of movement includes at least one of the sum of absolute difference (SAD) of the input movie-frame, and the size of a motion vector of the input movie-frame.

According to an exemplary aspect of the present invention, there is provided an image signal processing apparatus which processes images, the apparatus including a detection unit which detects amount of movement of an input movie-frame, and an image quality improving unit which adaptively processes improvement of image quality of the input movie-frame based on the amount of movement detected by the detection unit.

According to an exemplary aspect of the present invention, there is provided an audio video (AV) device which processes images and provides users the images, including a detection unit which detects amount of movement of an input movie-frame, and an image quality improving unit which adaptively processes improvement of image quality of the input movie-frame based on the amount of movement detected by the detection unit.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
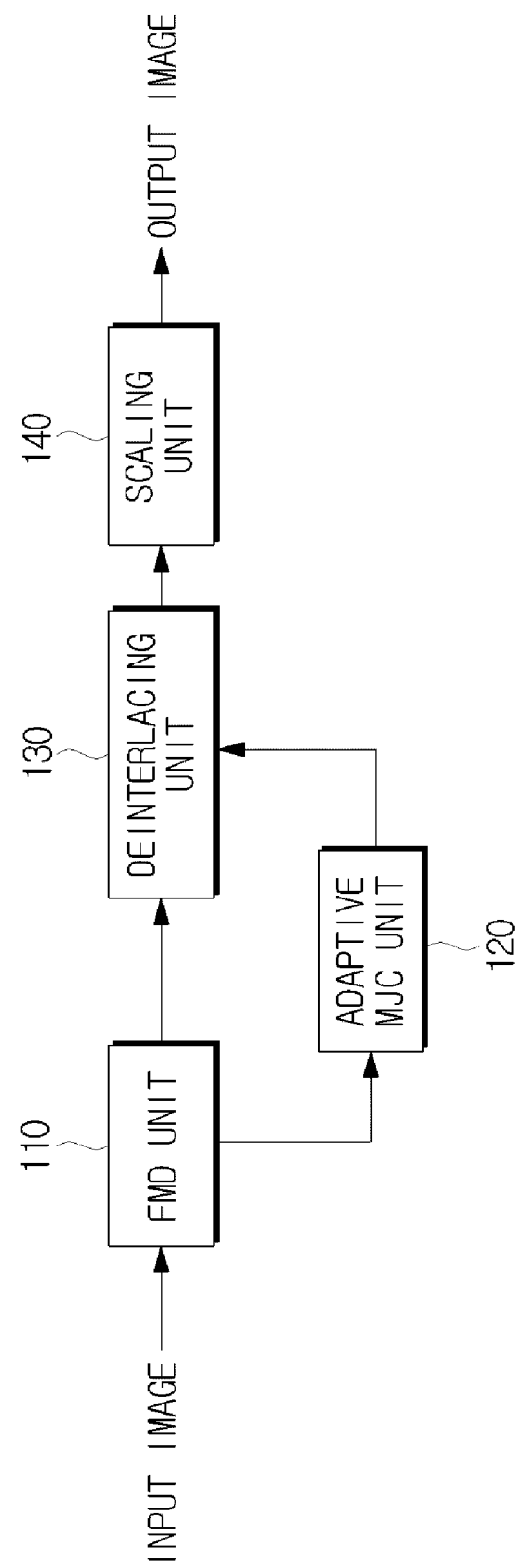
FIG. 1 is a block diagram of an image signal processing apparatus according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a block diagram of an image signal processing apparatus according to an exemplary embodiment of the present invention. The image signal processing apparatus is an apparatus which performs processing of input signals, such as deinterlacing and scaling.

While processing an image signal, the image signal processing apparatus performs movie judder cancellation (MJC) on a movie-image to improve the image quality of the movie-image. To this end, the image signal processing apparatus adaptively performs MJC based on the amount of movement of the movie-image.

The image signal processing apparatus includes a film mode detection (FMD) unit 110, an adaptive MJC unit 120, a deinterlacing unit 130, and a scaling unit 140.

The FMD unit 110 determines a mode of an input image. In more detail, the FMD unit 110 determines the mode of an input image by calculating the number of frames per second of the input image. If the frame rate is 24, the FMD unit 110 determines that the input image has film mode, that is, it is a movie-image.

The FMD unit 110 outputs the image to the adaptive MJC unit 120 or the deinterlacing unit 130 according to the mode. More specifically, if the input image is a movie-image, the FMD unit 110 outputs the input image to the adaptive MJC unit 120. If the input image is not a movie-image, the FMD unit 110 outputs the input image to the deinterlacing unit 130.

Figure 2:
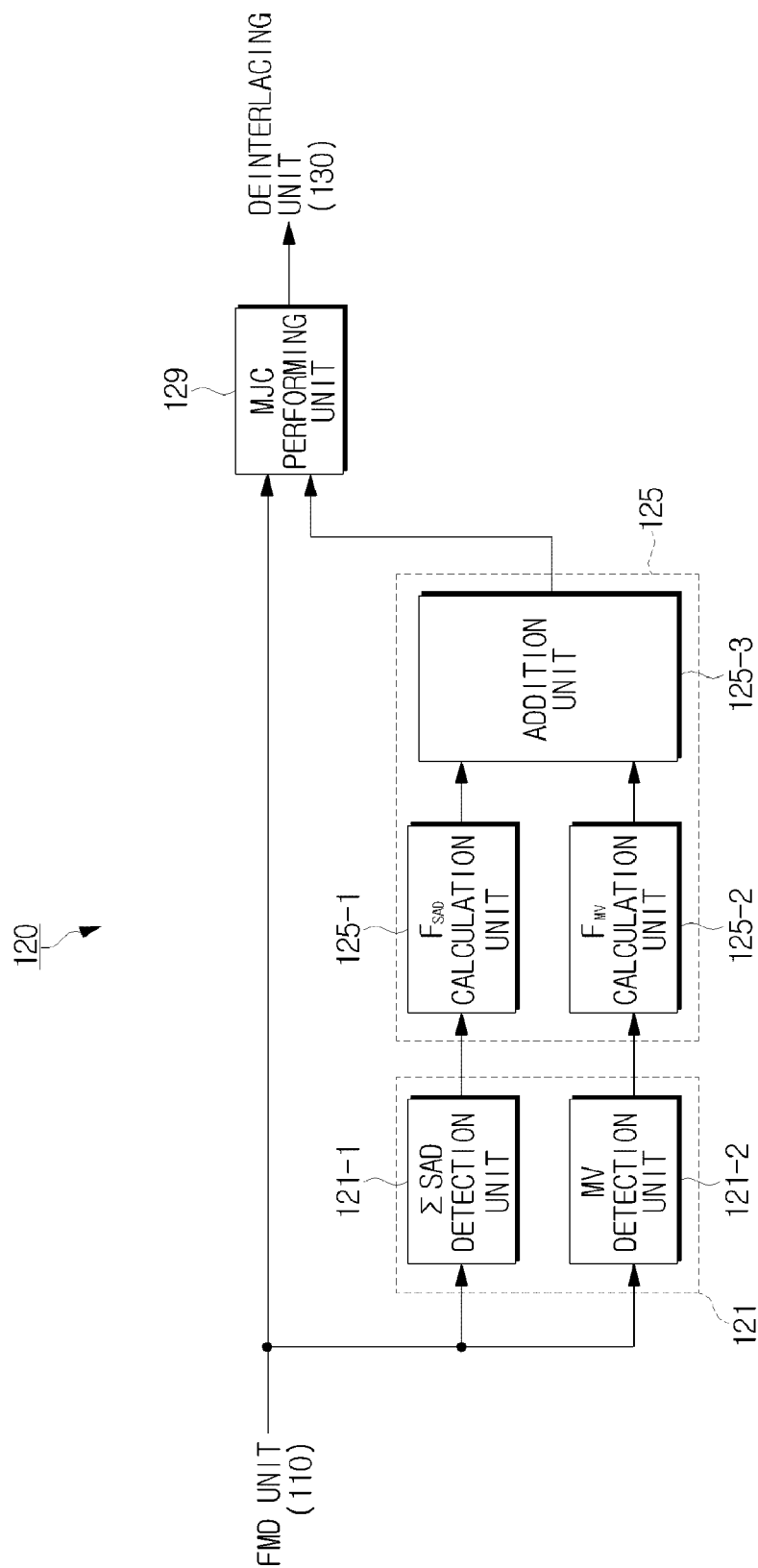
FIG. 2 is a detailed block diagram of an adaptive MJC unit 120 shown in FIG. 1.

The adaptive MJC unit 120 carries out MJC on the movie-image received from the FMD unit 110 to improve the image quality. This process is described in detail with reference to FIG. 2. FIG. 2 is a detailed block diagram of the adaptive MJC unit 120 shown in FIG. 1.

As shown in FIG. 2, the adaptive MJC unit 120 includes a movement amount detection unit 121, a factor calculation unit 125, and a MJC performing unit 129.

The movement amount detection unit 121 detects the amount of movement in each frame of the movie-image received from the FMD unit 110. The movement amount detection unit 121 includes a ΣSAD (sum of absolute difference) detection unit 121-1, and a motion vector (MV) detection unit 121-2.

The ΣSAD detection unit 121-1 detects ΣSAD of a movie-frame as the amount of movement of an input movie-frame (referred to hereinafter as the "amount of movement"). The ΣSAD of the movie-frame is the sum of SADs of macro blocks of the current movie-frame which is calculated by comparing the current movie-frame with a previous movie-frame. The ΣSAD is also indicated as Min. Error. The SAD is the sum of absolute differences between the value of each pixel constituting macro blocks of the current movie-frame and the value of each corresponding pixel constituting macro blocks of the previous movie-frame.

The MV detection unit 121-2 detects a motion vector of an input movie-frame (referred to hereinafter as the "motion vector") as the amount of movement.

The factor calculation unit 125 calculates a factor which is referred to for MJC using the ΣSAD detected by the ΣSAD detection unit 121-1, and the motion vector detected by the MV detection unit 121-2.

The factor calculation unit 125 includes a $F_{SAD}$ calculation unit 125-1, an $F_{MV}$ calculation unit 125-2, and an addition unit 125-3.

Figure 3A:
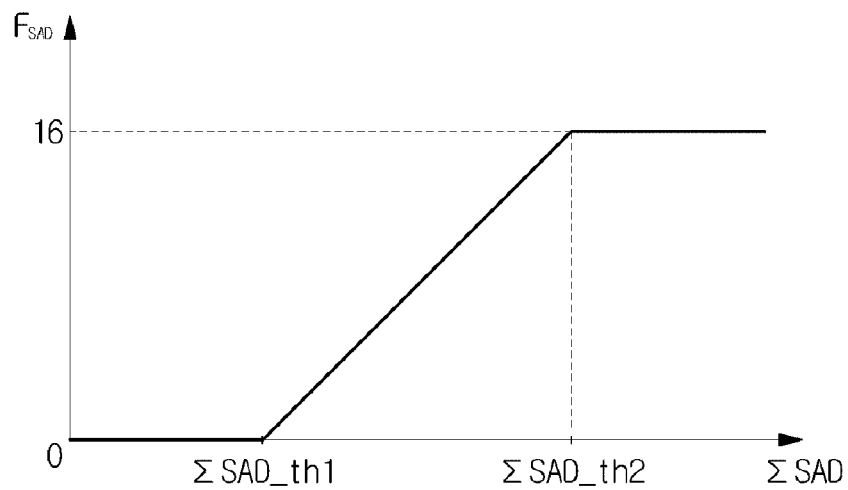
FIG. 3A is a graph used to calculate $F_{SAD}$.

The $F_{SAD}$ calculation unit 125-1 calculates an $F_{SAD}$ by putting the ΣSAD detected by the ΣSAD detection unit 121-1 to the graph of FIG. 3A. In FIG. 3A, $F_{SAD}$ is a factor having a value ranging from 0 to 16.

As shown in FIG. 3A, if the ΣSAD is lower than a first threshold value of ΣSAD_th1, the $F_{SAD}$ is 0, and if the ΣSAD is higher than a second threshold value of ΣSAD_th2, the $F_{SAD}$ is 16.

If the ΣSAD is higher than ΣSAD_th1 and lower than ΣSAD_th2, the $F_{SAD}$ is proportional to the ΣSAD. That is, if the ΣSAD is higher than ΣSAD_th1 and lower than ΣSAD_th2, the $F_{SAD}$ adaptively changes according to the ΣSAD.

The $F_{MV}$ calculation unit 125-2 is described in detail with reference to FIG. 2.

Figure 3B:
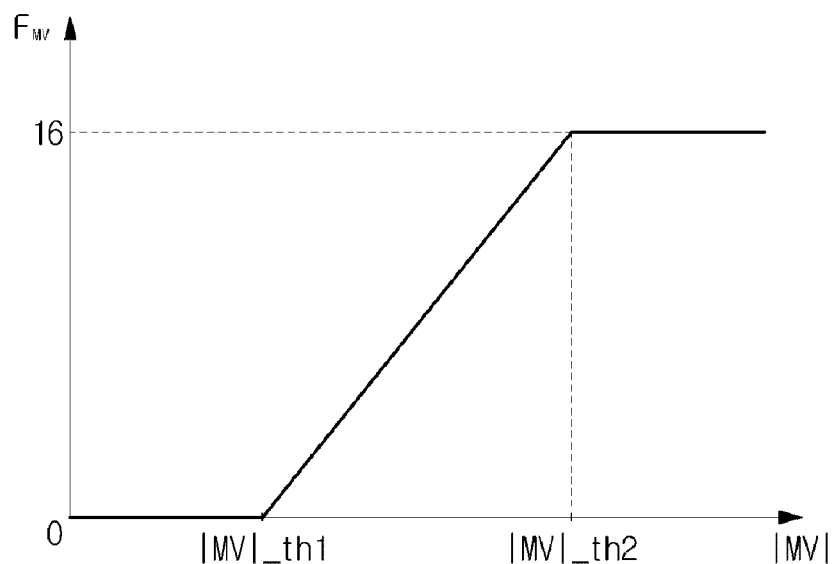
FIG. 3B is a graph used to calculate $F_{MV}$.

The $F_{MV}$ calculation unit 125-2 calculates an $F_{MV}$ by putting |MV| detected by the MV detection unit 121-2 into the graph of FIG. 3B. In FIG. 3B, $F_{MV}$ is a factor having a value ranging from 0 to 16, which is as in $F_{SAD}$.

As shown in FIG. 3B, if |MV| is lower than a first threshold value of |MV|_th1 the $F_{MV}$ is 0, and if |MV| is higher than a second threshold value of |MV|_th2, the $F_{MV}$ is 16.

If |MV| is higher than |MV|_th1 and lower than |MV|_th2, the $F_{MV}$ is proportional to |MV|. That is, if |MV| is higher than |MV|_th1 and lower than |MV|_th2, the $F_{MV}$ adaptively changes according to |MV|.

The addition unit 125-3 is described in detail with reference to FIG. 2.

The addition unit 125-3 calculates F (=$F_{SAD}$+$F_{MV}$), which is the sum of $F_{SAD}$ calculated by the ΣSAD calculation unit 125-1 and $F_{MV}$ calculated by the $F_{MV}$ calculation unit 125-2, as a factor.

Figure 3C:
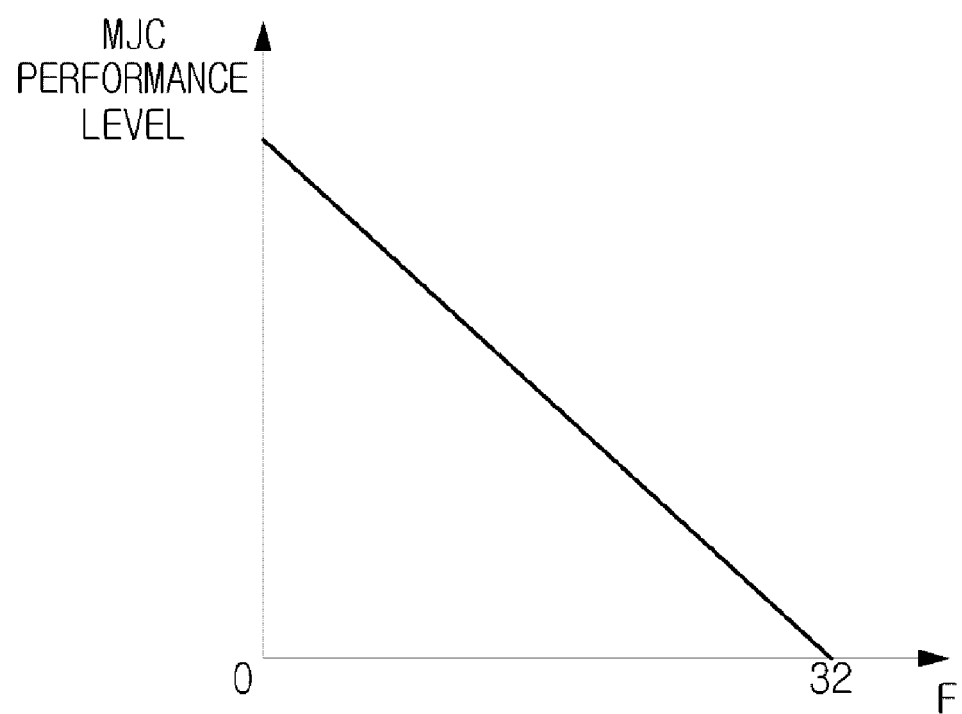
FIG. 3C is a graph used to determine the amount of MJC performance.

The MJC performing unit 129 is a type of element for improving image quality which calculates MJC performance level by putting F calculated by the addition unit 125-3 into the graph of FIG. 3C, and performs MJC on the input movie-frame according to the calculated MJC performance level. As shown in FIG. 3C, the MJC performance level is inversely proportional to F.

In FIG. 3C, if F is 0, the MJC performance level is maximized. Since F is $F_{SAD}$+$F_{MV}$, if F is 0, $F_{SAD}$ and $F_M$ are also 0. This means ΣSAD<ΣSAD_th1 and |MV|<|MV|_th1, or, in other words, movement is very low.

In FIG. 3C, if F is 32, the MJC performance level is minimized. Since F is $F_{SAD}$+$F_{MV}$, if F is 32, $F_{SAD}$ is 16, and $F_M$ is also 16. This means ΣSAD>ΣSAD_th2 and |MV|>|MV|_th2, or, in other words, movement is very high.

If F is higher than 0 and lower than 32, the MJC performance level is inversely proportional to F. Since F is $F_{SAD}$+$F_{MV}$, if F is higher than 0 and lower than 32, $F_{SAD}$ is higher than 0 and lower than 16, and $F_M$ is higher than 0 and lower than 16. This means ΣSAD_th1<ΣSAD<ΣSAD_th2, or

|MV|_th1<|MV|<|MV|_th2, or in other words, movement is neither very low nor very high.

The movie-frame MJC-processed in the MJC performing unit 129 is output to the deinterlacing unit 130. Hereinafter, please refer to FIG. 1 again.

The deinterlacing unit 130 receives an image from the FMD unit 110 or the adaptive MJC unit 120. If the input image is an interlaced image, the deinterlacing unit 130 converts the input image into a progressive image by deinterlacing.

The scaling unit 140 adjusts the scale of the image output from the deinterlacing unit 130 so that the image size fits on the display.

The process of processing an image signal of the image signal processing apparatus of FIG. 1 is described with reference to FIG. 4.

Figure 4:
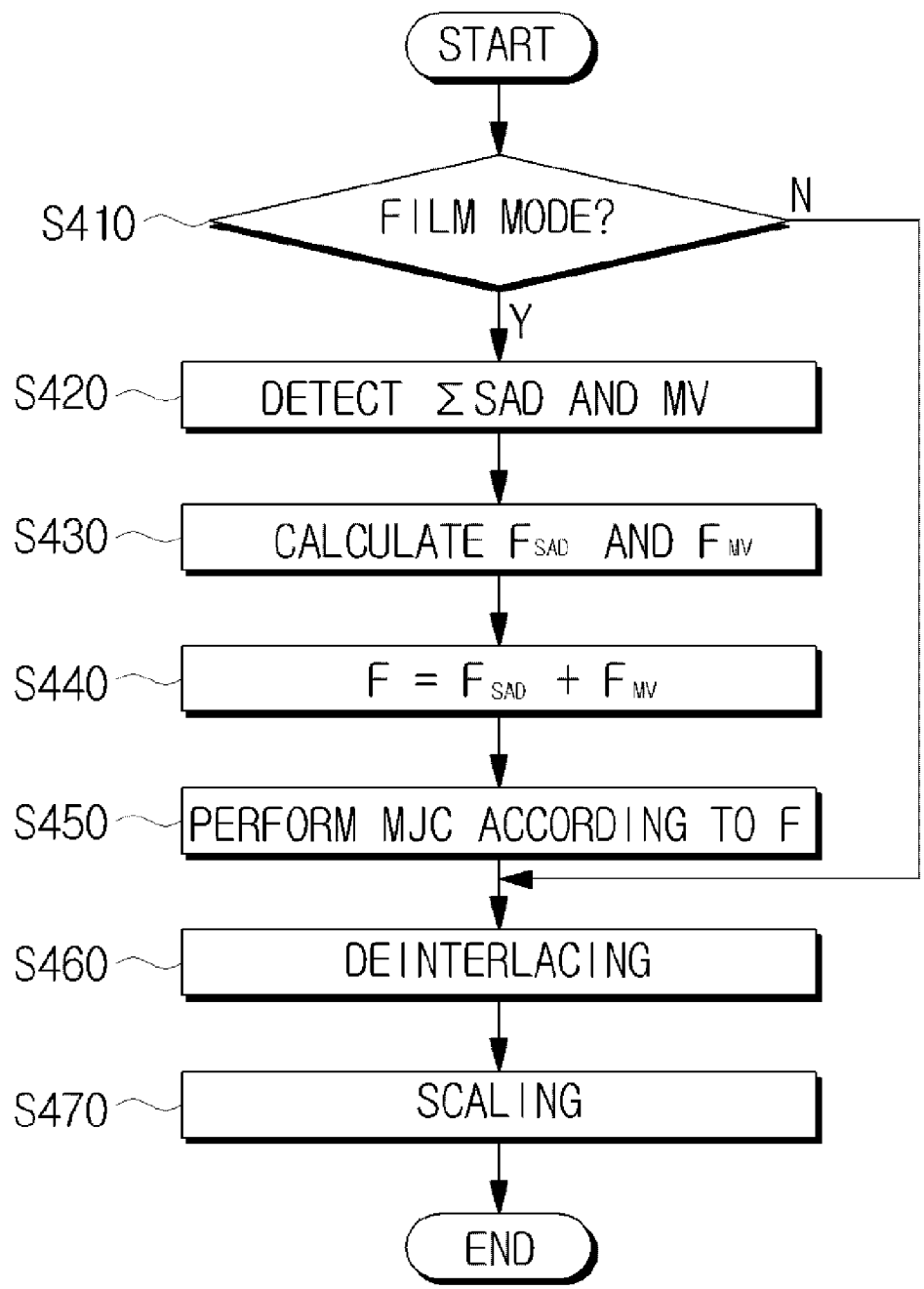
FIG. 4 is a flow chart to illustrate the process of processing an image signal of the image signal processing apparatus shown in FIG. 1.

As shown in FIG. 4, in operation S410, the FMD unit 110 determines the mode of an input image.

If the input image is in film mode in S410-Y, the ΣSAD detection unit 121-1 in the adaptive MJC unit 120 detects ΣSAD of the input image, and the MV detection unit 121-2 detects a motion vector of the input image in operation S420.

Subsequently, in operation S430, the $F_{SAD}$ calculation unit 125-1 in the adaptive MJC unit 120 calculates an $F_{SAD}$ by putting the ΣSAD into the graph of FIG. 3A, and the $F_{MV}$ calculation unit 125-2 calculates an $F_{MV}$ by putting |MV| (the size of MV) into the graph of FIG. 3B.

In operation S440, the addition unit 125-3 in the adaptive MJC unit 120 calculates F (=$F_{SAD}$+$F_{MV}$), which is the sum of $F_{SAD}$ and $F_{MV}$, as a factor.

In operation S450, the MJC performing unit 129 calculates MJC performance level by putting F into the graph of FIG. 3C, and performs MJC of the input movie-frame according to the calculated MJC performance level.

Next, if the input image is an interlaced image, the deinterlacing unit 130 performs deinterlacing in operation S460, and the scaling unit 140 scales the input image in operation S470.

The process of adaptively performing MJC based on the amount of movement of an input movie-image has been described in detail with reference to the exemplary embodiment.

In the exemplary embodiment, MJC performance level is determined by a factor calculated using ΣSAD and MV, but this is just given as an example for ease of understanding and convenience of description, and the present invention is not limited thereto. Accordingly, even when MJC performance level is directly determined using ΣSAD and MV without calculating the factor, technical idea of the present invention can be applied. That is, when MJC performance level is "adaptively" determined directly or indirectly using the amount of movement, such as ΣSAD and MV, (for example, MJC performance level is adaptively inversely proportional to the amount of movement of the movie-frame), this case is also included within the scope of the present invention.

ΣSAD and MV are just an example of amount of movement for convenience of description. Accordingly, even when other indexes indicating the amount of movement are used, the technical idea of the present invention can be applied.

In the exemplary embodiment, MJC is adaptively performed using both ΣSAD and MV, but this is just given as an example for ease of understanding and convenience of description. Even when MJC is adaptively performed using one of ΣSAD and MV, the technical idea of the present invention can be applied.

Furthermore, MJC is an example of a process to improve the image quality of movie-images, and the technical idea of the present invention can be applied to other processes of improving the image quality.

In graphs of FIGS. 3A and 3B, $F_{SAD}$ and $F_{MV}$ are described as linearly proportional to ΣSAD and |MV|, respectively, between the first threshold value and the second threshold value, but this is merely an example. $F_{SAD\ and}\ F_{MV}$ may be non-linearly proportional to ΣSAD and |MV|, respectively, between the first threshold value and the second threshold value.

In addition, in graphs of FIG. 3C, the MJC performance level is described as linearly in inverse proportion to F, but this is just an example. Accordingly, the MJC performance level may be nonlinearly in inverse proportion to F.

In graphs of FIGS. 3A and 3B, there are two threshold values, but the number of threshold values is not limited thereto. Even when there are three or more threshold values, the technical idea of the present invention can be applied. If there are three or more threshold values, each inclination between the threshold values may be set differently.

Moreover, if F is 32, that is, the amount of movement is very high, the MJC performance level is determined to be 0, but this is an example for convenience of explanation. Accordingly, the MJC performance level may have a value other than 0.

The image signal processing apparatus as shown in FIG. 1 is given as an example for convenience of explanation. An image signal processing apparatus applying the present invention does not necessarily include all the units as shown in FIG. 1. The technical idea of the present invention can be applied to an image signal processing apparatus omitting the deinterlacing unit 130 from the units of FIG. 1.

The image signal processing apparatus according to the present invention may be mounted in an audio video (AV) device which processes AV signals and provides users with the AV signals. The AV device reproduces AV stored in a hard disk drive (HDD), a digital video disk (DVD), or a memory device, or AV received from the outside to users, and may be a broadcast receiving apparatus such as a television and a set top box, a personal multimedia player (PMP), a digital video express (DivX) player, a mobile phone having an AV reproduction function, or an MP3 player.

Figure 5:
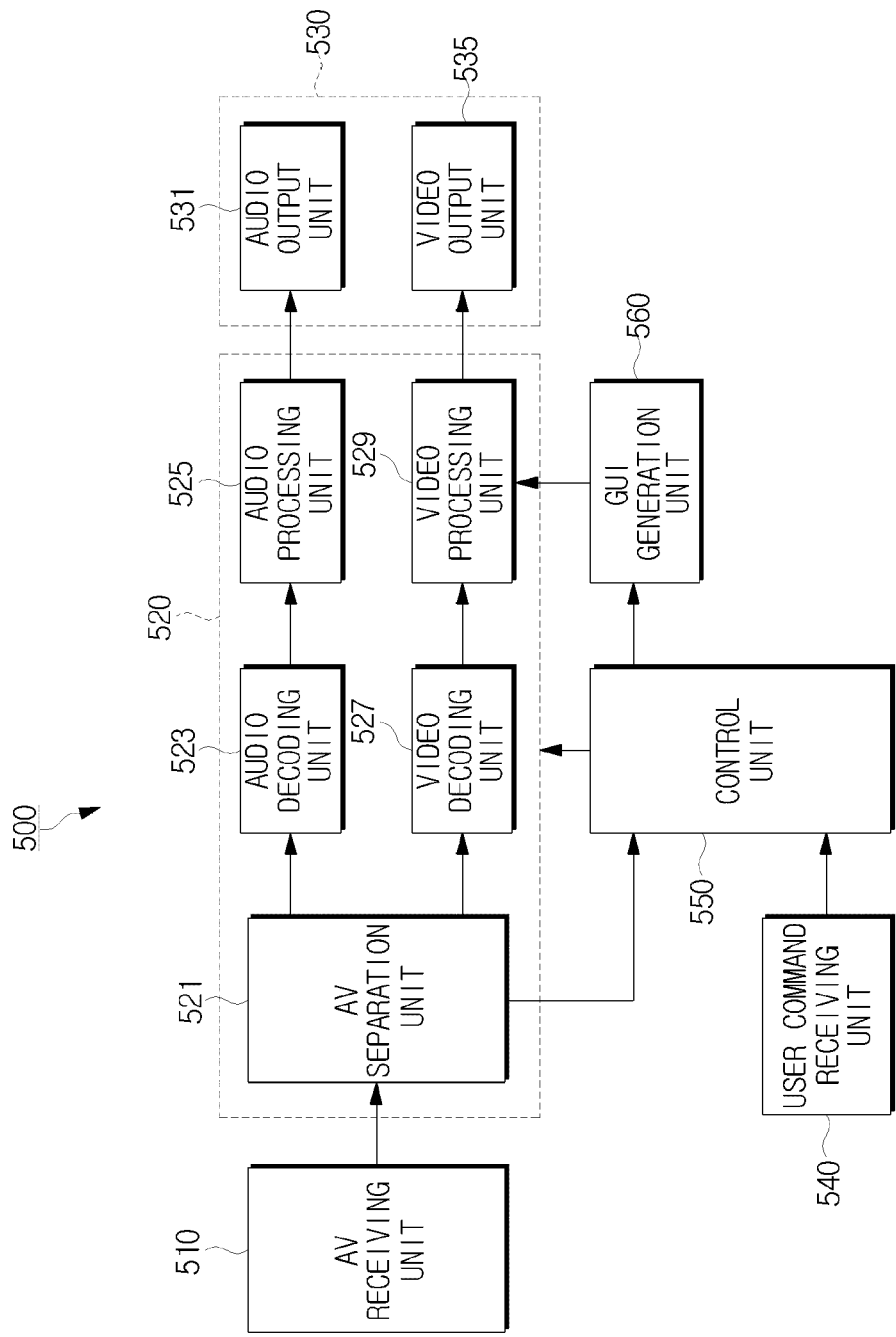
FIG. 5 is a block diagram of an AV device according to another exemplary embodiment of the present invention.

FIG. 5 is a block diagram of an AV device according to another exemplary embodiment of the present invention. As shown in FIG. 5, the AV device 500 includes an AV receiving unit 510, an AV processing unit 520, an AV output unit 530, a user command receiving unit 540, a control unit 550, and a graphic user interface (GUI) generation unit 560.

The AV receiving unit 510 receives an AV signal input from an external device, and the AV processing unit 520 processes the AV signal output from the AV receiving unit 510.

The AV processing unit 520 includes an AV separation unit 521, an audio decoding unit 523, an audio processing unit 525, a video decoding unit 527, and a video processing unit 529.

The AV separation unit 521 separates the AV signal output from the AV receiving unit 510 into an audio signal, and a video signal.

The audio decoding unit 523 decodes the audio signal output from the broadcast separation unit 521, and the audio processing unit 525 processes the decoded audio signal output from the audio decoding unit 523.

The video decoding unit 527 decodes the video signal output from the AV separation unit 521, and the video processing unit 529 processes the decoded video signal output from the video decoding unit 527.

The GUI generation unit 560 generates a GUI to be displayed on a display unit. The generated GUI is transmitted to the video processing unit 529, and added to video displayed on the display unit.

The output unit 530 includes an audio output unit 531, and a video output unit 535. The audio output unit 531 outputs the audio signal output from the audio processing unit 525 through a speaker. The video output unit 535 outputs the video signal output from the video processing unit 529 on the display unit.

The user command receiving unit 540 transmits user commands received from a remote control to the control unit 550. The control unit 550 controls the entire operation of the AV device 500 according to the user commands received from the user command receiving unit 540.

The video processing unit 529 may be implemented with the image signal processing apparatus as described above.

Furthermore, even when the adaptive MJC unit 120 of FIG. 2 is implemented with a separate element, the technical idea of the present invention can be applied.

As can be appreciated from the above description, processing image signals relating to improving the image quality can be adaptively performed based on the amount of movement of an input movie-image so that MJC of the movie-image can be performed without breaking the image, and judder of the movie-image can be reduced.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for improving image quality of an input movie-frame, the method comprising:
    detecting an amount of movement in the input movie-frame; and
    adaptively performing movie judder cancellation (MJC) of the input movie-frame based on the detected amount of movement
    wherein an MJC performance level is inversely proportional to the detected amount of movement.

2. The method of claim 1, wherein the adaptively performing the MJC comprises, if the detected amount of movement is higher than a first threshold value and lower than a second threshold value, changing the MJC performance level according to the detected amount of movement.

3. The method of claim 2, wherein the MJC performance level is inversely proportional to the detected amount of movement if the detected amount of movement is higher than the first threshold value and lower than the second threshold value.

4. The method of claim 2, wherein if the detected amount of movement is lower than the first threshold value, the MJC performance level is maximized, and if the detected amount of movement is higher than the second threshold value, the MJC performance level is minimized.

5. The method of claim 1, wherein the detected amount of movement includes at least one of a sum of an absolute difference (SAD) of the input movie-frame, and a size of a motion vector of the input movie-frame.

6. An apparatus to improve image quality of an input movie-frame, comprising:
    a detection unit which detects an amount of movement of the input movie-frame; and
    an image quality improving unit which adaptively performs movie judder cancellation (MJC) of the input movie-frame based on the amount of movement detected by the detection unit,
    wherein an MJC performance level is inversely proportional to the detected amount of movement.

7. The apparatus of claim 6, wherein if the detected amount of movement is higher than a first threshold value and lower than a second threshold value, the image quality improving unit changes the MJC performance level according to the detected amount of movement.

8. The apparatus of claim 7, wherein if the detected amount of movement is higher than the first threshold value and lower than the second threshold value, the image quality improving unit causes the MJC performance level to be inversely proportional to the detected amount of movement.

9. The apparatus of claim 7, wherein if the detected amount of movement is lower than the first threshold value, the image quality improving unit maximizes the MJC performance level, and if the detected amount of movement is higher than the second threshold value, the image quality improving unit minimizes the MJC performance level.

10. The apparatus of claim 6, wherein the detected amount of movement includes at least one of a sum of an absolute difference (SAD) of the input movie-frame, and a size of a motion vector of the input movie-frame.

11. An apparatus which processes images, the apparatus comprising:
    a detection unit which detects an amount of movement of the input movie-frame; and
    an image quality improving unit which adaptively performs movie judder cancellation (MJC) of the input movie-frame based on the amount of movement detected by the detection unit,
    wherein the apparatus is an image signal processing apparatus.

12. An apparatus which processes images and provides the processed images to a user, the apparatus comprising:
    a detection unit which detects an amount of movement of the input movie-frame; and
    an image quality improving unit which adaptively performs movie judder cancellation (MJC) of the input movie-frame based on the amount of movement detected by the detection unit,
    wherein the apparatus is an audio video device.

* * * * *